United States Patent
Chuang

(10) Patent No.: US 6,843,466 B1
(45) Date of Patent: Jan. 18, 2005

(54) ROTATIONAL SPEED ADJUSTMENT MECHANISM OF A PNEUMATIC TOOL

(76) Inventor: Chia-Chiung Chuang, 3F, No. 22, Lane 337, Soug-Jwu, Taichung City (TW)

( * ) Notice: Subject to any disclaimer, the term of this patent is extended or adjusted under 35 U.S.C. 154(b) by 0 days.

(21) Appl. No.: 10/636,805

(22) Filed: Aug. 8, 2003

(51) Int. Cl.[7] ............................................... F16K 5/06
(52) U.S. Cl. ........................................ 251/207; 251/311
(58) Field of Search ................................ 251/205–209, 251/309–312

(56) References Cited

U.S. PATENT DOCUMENTS

| | | | | |
|---|---|---|---|---|
| 3,783,890 A | * | 1/1974 | Wurzburger | 137/315.25 |
| 4,406,442 A | * | 9/1983 | Bettin et al. | 251/310 |
| 4,562,994 A | * | 1/1986 | MacDonald | 251/175 |
| 4,582,084 A | * | 4/1986 | Gyurovits | 137/493.8 |
| 4,632,362 A | * | 12/1986 | Lucking | 251/310 |
| 5,971,604 A | * | 10/1999 | Linga et al. | 366/340 |

* cited by examiner

*Primary Examiner*—Paul J. Hirsch
(74) *Attorney, Agent, or Firm*—Dennison, Schultz, Dougherty & MacDonald

(57) ABSTRACT

A rotational speed adjustment mechanism of a pneumatic tool, including an intake member, a speed adjustment valve and a case enclosing the intake member and the speed adjustment valve. The intake member is formed with an intake and an exhaust port which are not communicated with each other. A lateral outlet and a lateral inlet are formed on the sidewall of the body section for communicating the intake with the exhaust port. The speed adjustment valve has a collar coaxially fitted on the body section and rotatable between a full speed position and a slowest speed position. A full speed through hole and at least one slow speed through hole are formed on the sidewall of the collar. When the collar is positioned in the full speed position, the full speed through hole is coaxially communicated with the lateral outlet, whereby the full diameter range of the lateral outlet provides a passage for the airflow. When the collar is positioned in the slowest speed position, the slow speed through hole is communicated with the lateral outlet, whereby simply the diameter range of the slow speed through hole provides a passage for the airflow.

6 Claims, 4 Drawing Sheets

ROTATIONAL SPEED ADJUSTMENT MECHANISM OF A PNEUMATIC TOOL

BACKGROUND OF THE INVENTION

The present invention is related to a pneumatic tool, and more particularly to a rotational speed adjustment mechanism of a pneumatic tool.

There are various conventional rotational speed adjustment mechanisms for controlling the rotational speed of the rotor of a pneumatic tool by means of controlling the flow of the air. In the conventional rotational speed adjustment mechanisms, a specially shaped valve stem is disposed in the air way between the air room and the internal intake passage of the handle for changing the rotational speed of the rotor. It is uneasy to manufacture and process the specially shaped valve stem. Therefore, it is hard to control the precision of the valve stem.

Furthermore, the entire rotational speed adjustment mechanism is disposed in a middle position of the air way of the pneumatic tool. Therefore, when the high pressure air is filled up in the intake passage, the air pressure will lead to leakage of a part of the air. As a result, the energy is partially wasted.

SUMMARY OF THE INVENTION

It is therefore a primary object of the present invention to provide a rotational speed adjustment mechanism of a pneumatic tool. The components of the rotational speed adjustment mechanism are simplified and easy to manufacture and process at high precision. Therefore, the quality of the product can be easily maintained.

It is a further object of the present invention to provide the above rotational speed adjustment mechanism of the pneumatic tool, which previously regulates the high pressure air before the air goes into the pneumatic tool and only allows the necessary air to enter the airway of the pneumatic tool.

According to the above objects, the rotational speed adjustment mechanism of the present invention includes an intake member, a speed adjustment valve and a case enclosing the intake member and the speed adjustment valve. The intake member is formed with an intake and an exhaust port which are not communicated with each other. A lateral outlet and a lateral inlet are formed on the sidewall of the body section for communicating the intake with the exhaust port. The speed adjustment valve has a collar coaxially fitted on the body section and rotatable between a full speed position and a slowest speed position. A full speed through hole and at least one slow speed through hole are formed on the sidewall of the collar. When the collar is positioned in the full speed position, the full speed through hole is coaxially communicated with the lateral outlet, whereby the full diameter range of the lateral outlet provides a passage for the airflow. When the collar is positioned in the slowest speed position, the slow speed through hole is communicated with the lateral outlet, whereby simply the diameter range of the slow speed through hole provides a passage for the airflow. The case is formed with an internal passage defined between the case and the body section and the collar for communicating the lateral outlet with the lateral inlet.

The present invention can be best understood through the following description and accompanying drawings wherein:

DETAILED DESCRIPTION OF THE PREFERRED EMBODIMENTS

Figure 1:
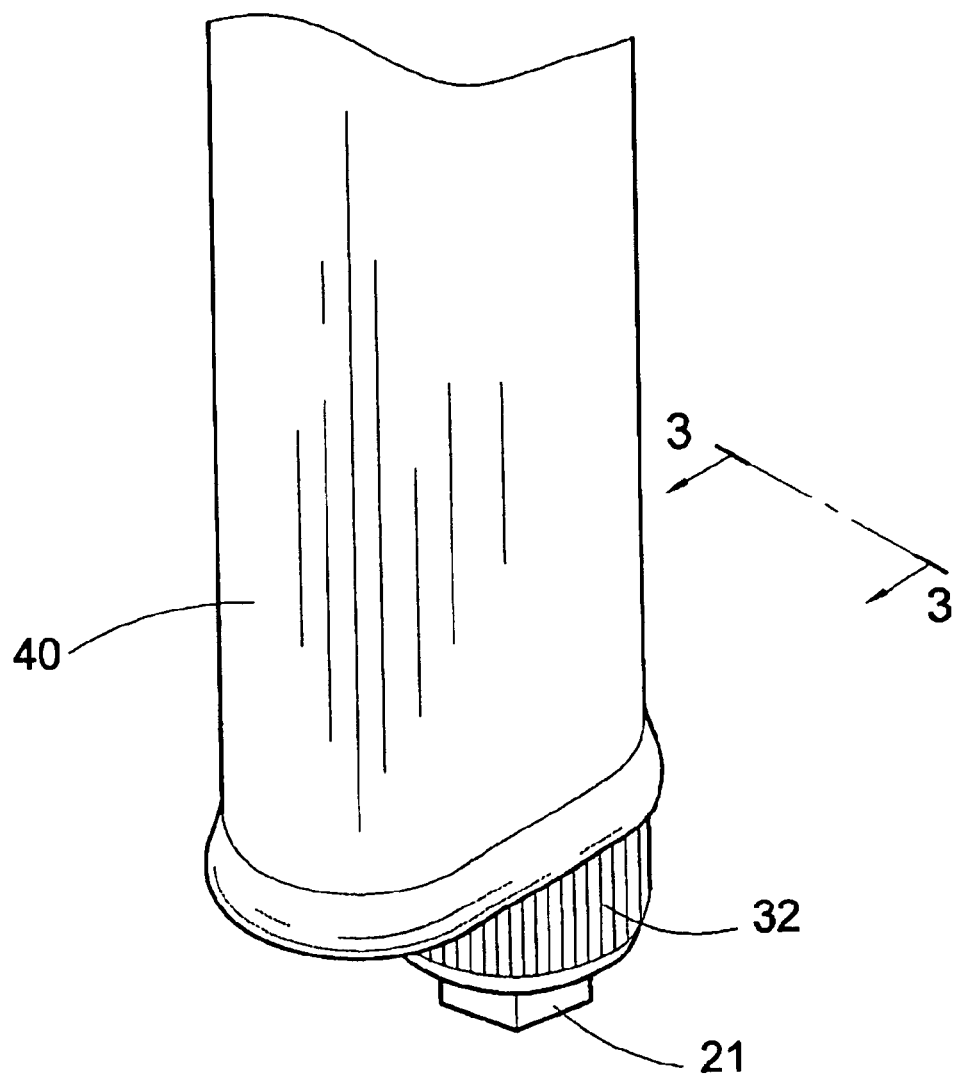
FIG. 1 is a perspective assembled view of a preferred embodiment of the present invention.
Figure 2:
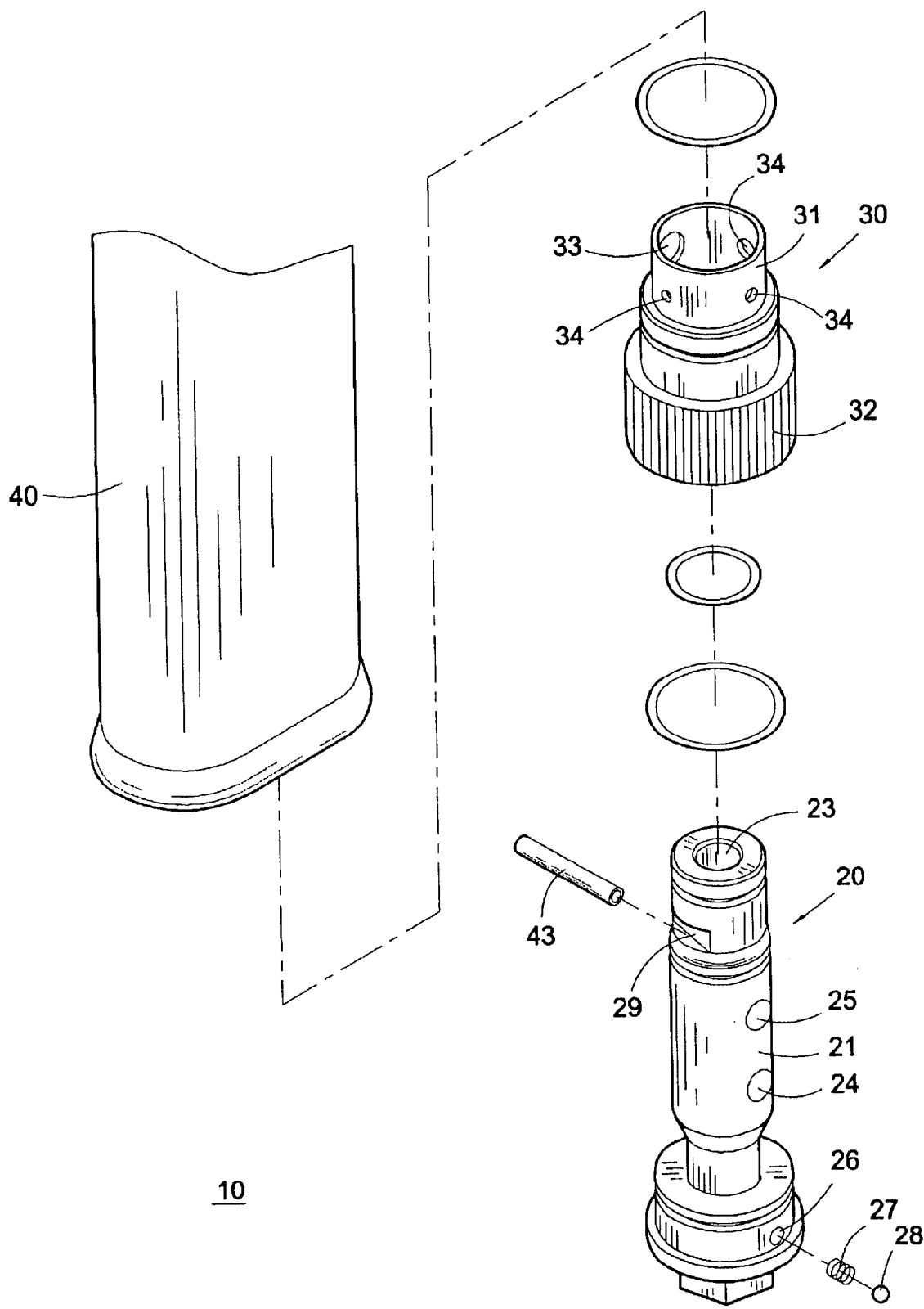
FIG. 2 is a perspective exploded view of the preferred embodiment of the present invention.
Figure 3:
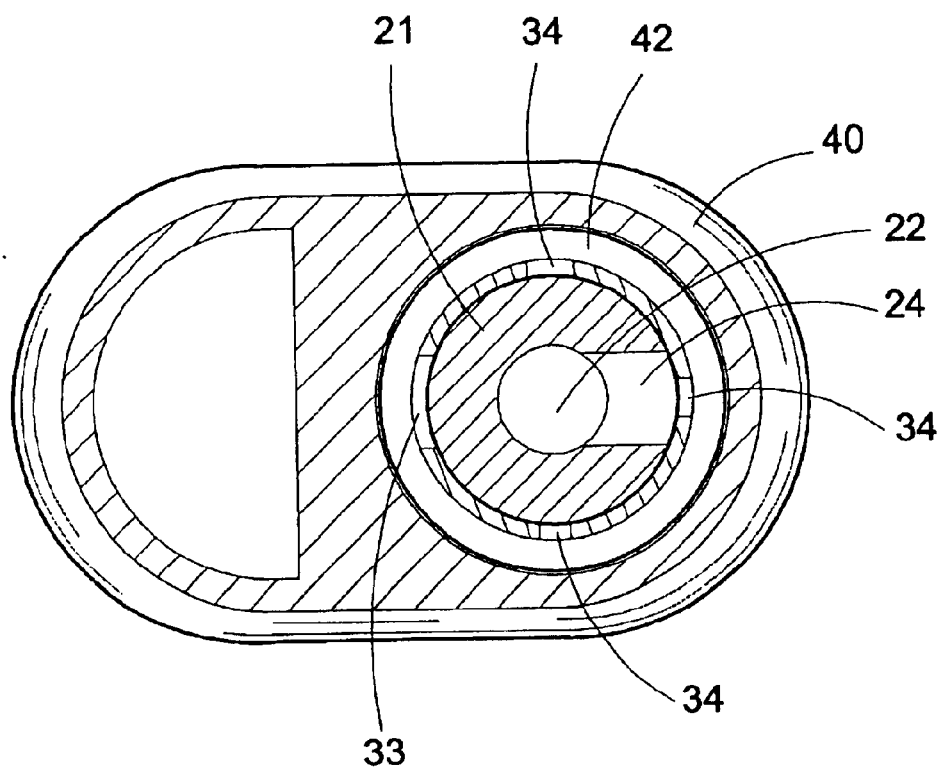
FIG. 3 is a sectional view taken along line 3—3 of FIG. 1.
Figure 4:
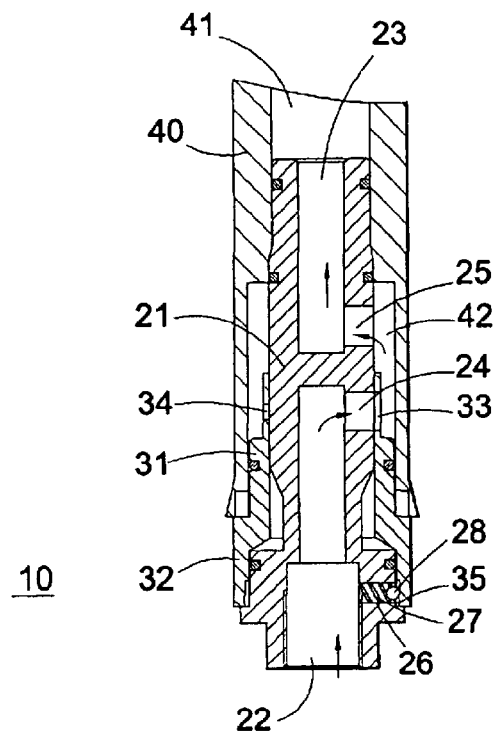
FIG. 4 is a sectional view of the preferred embodiment of the present invention, showing that the collar is positioned in the full speed position.
Figure 5:
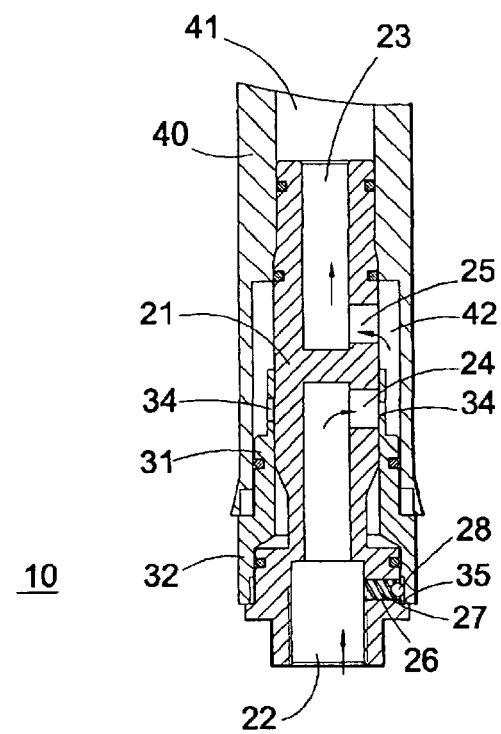
FIG. 5 is a sectional view of the preferred embodiment of the present invention, showing that the collar is positioned in the slow speed position.

Please refer to FIGS. 1 to 5. The rotational speed adjustment mechanism 10 of the present invention includes an intake member 20, a speed adjustment valve 30 and a case 40.

The intake member 20 has an upright cylindrical body section 21 with a certain length. An intake 22 upward axially extends from the bottom end of the body section 21 by a certain depth. An exhaust port 23 downward axially extends from the top end of the body section 21 by a certain depth. The inner ends of the intake 22 and the exhaust port 23 are separated without communicating with each other. A lateral outlet 24 perpendicularly extends from one side of the inner end of the intake 22 through the wall of the body section. A lateral inlet 25 perpendicularly extends from one side of the inner end of the exhaust port 23 through the wall of the body section. The lateral outlet 24 and the lateral inlet 25 are parallel to each other, whereby the intake 22 and the exhaust port 23 are communicated with each other through outer side of the body section 21. A cavity 26 is formed on the circumference of bottom end of the body section 21 for receiving a spring 27 and an engaging ball 28 therein. A locating notch 29 is formed on the circumference of the top side of the body section 21.

The speed adjustment valve 30 has an annular collar 31 and an annular rotary sleeve 32 which are coaxially connected and rotatably fitted on the body section 21. The speed adjustment valve 30 can be rotated between a full speed position and a slowest speed position. The collar 31 blocks the opening of the lateral outlet 24. The rotary sleeve 32 is fitted around the bottom end of the body section 21. The inner circumference of the rotary sleeve 32 abuts against the engaging ball 28. A full speed through hole 33 and three slow speed through holes 34 are formed on the collar 31 at equal intervals. The diameter of the full speed through hole 33 is at least equal to the diameter of the lateral outlet 24. The diameters of the three slow speed through holes 34 are unequal from each other and are all smaller than the diameter of the lateral outlet 24. Any of the full speed through hole 33 and the slow speed through holes 34 can be selectively communicated with the lateral outlet 24. When the collar 31 is positioned in the full speed position, the full speed through hole 33 is coaxially communicated with the opening of the lateral outlet 24. At this time, the full diameter range of the lateral outlet 24 provides a passage for the airflow. When the collar 31 is positioned in the slowest speed position, the slow speed through hole 34 with the smallest diameter is communicated with the lateral outlet 24. At this time, the lateral outlet 24 is partially blocked by the circumferential wall of the slow speed through hole 34. Accordingly, simply the diameter range of the slow speed through hole 34 provides a passage for the airflow. Alternatively, the collar 31 can be turned to the position where any other two slow speed through hole 34 is communicated with the lateral outlet 24. At this time, the lateral outlet 24 is partially blocked by the circumferential wall of the slow speed through hole 34 and different sizes of airflow passages are achievable. The inner circumference of the rotary sleeve 32 can be formed with dents 35 respectively corresponding to the different speed positions. When the collar 31 is turned to a specific position, the engaging ball 28 is engaged in the dent 35 to locate the collar 31 and enable a user to know the location of the collar 31.

The case 40 can be a handle of a common pneumatic wrench. The case 40 encloses the body section 21 and the collar 31 to isolate the body section and the collar from outer side. The case 40 has an air way 41 communicating with the opening of the exhaust port 23 for conducting the air to flow into the air room of the pneumatic tool. This pertains to prior art and will not be further described hereinafter. An internal passage 42 is formed in the case 40 around the body section 21 and the collar 31. The internal passage 42 serves as a close space defined between the case 40 and the body section 21 and the collar 31 for communicating the lateral outlet 24 and the lateral inlet 25. A middle section of a locating bolt 43 is inlaid in the locating notch 29. Two ends of the locating bolt 43 are fixedly connected with the case 40, whereby the body section 21 is located in the case 40.

According to the above arrangement, in use of the rotational speed adjustment mechanism 10, the bottom end of the body section 21 is communicated with external high pressure air supply via a pipeline. Accordingly, the high pressure air is filled up in the intake 22. By means of the speed adjustment valve 30, the diameter of the lateral outlet 24 communicating with the internal passage 42 is changeable. By means of changing the diameter, the flow of the high pressure air flowing from the intake 22 through the lateral outlet 24 and the corresponding through hole 34 into the internal passage 42 is controllable. Accordingly, the necessary air will flow from the internal passage 42 through the lateral inlet 25 and the exhaust port 23 into the airway 41 to serve as the power source of the pneumatic tool.

The rotational speed adjustment mechanism 10 previously regulates the high pressure air before the air goes into the pneumatic tool and only allows the necessary air to enter the pneumatic tool. Accordingly, the internal airway of the pneumatic tool is prevented from always suffering the high pressure equal to external air supply. Therefore, the components of the pneumatic tool are protected from being worn due to continuous pressurization. In addition, the leakage of air is avoided and the energy can be effectively utilized. Furthermore, in contrast to the conventional valve stem with special shape, it is easy to manufacture and process the components of the rotational speed adjustment mechanism 10 at high precision. Therefore, the quality of the product can be easily maintained and the possibility of damage of the parts is greatly lowered.

The above embodiments are only used to illustrate the present invention, not intended to limit the scope thereof. Many modifications of the above embodiments can be made without departing from the spirit of the present invention.

What is claimed is:

1. A rotational speed adjustment mechanism of a pneumatic tool, comprising:

an intake member having a cylindrical body section, an intake inward axially extending from one end of the body section, an exhaust port inward axially extending from the other end of the body section, inner ends of the intake and the exhaust port being not communicated with each other, a lateral outlet extending from the intake through a sidewall of the body section for communicating the intake with outer side of the body section, a lateral inlet extending from the exhaust port through a sidewall of the body section for communicating the exhaust port with outer side of the body section;

a speed adjustment valve having an annular collar which is coaxially rotatably fitted on the body section for blocking the opening of the lateral outlet, the collar being rotatable about the axis of the body section between a full speed position and a slowest speed position, a full speed through hole being formed through a sidewall of the collar, the diameter of the full speed through hole being at least equal to the diameter of the lateral outlet, at least one slow speed through hole being formed through a sidewall of the collar, the diameter of the slow speed through hole being smaller than the diameter of the lateral outlet, when the collar is turned and positioned in the full speed position, the full speed through hole being coaxially communicated with the opening of the lateral outlet, whereby the full diameter range of the lateral outlet provides a passage for the airflow, when the collar is turned and positioned in the slowest speed position, the slow speed through hole being communicated with the lateral outlet, whereby the lateral outlet is partially blocked by the circumferential wall of the slow speed through hole and simply the diameter range of the slow speed through hole provides a passage for the airflow; and a case enclosing the body section and the collar to isolate the body section and the collar from outer side, the case being formed with an internal passage defined between the case and the body section and the collar for communicating the lateral outlet with the lateral inlet.

2. The rotational speed adjustment mechanism of the pneumatic tool as claimed in claim 1, wherein the body section is fixedly connected with the case.

3. The rotational speed adjustment mechanism of the pneumatic tool as claimed in claim 2, wherein the intake member is formed with a locating notch formed on a circumference of one end of the body section, the case including a locating bolt, a middle section of the locating bolt being inlaid in the locating notch, at least one end of the locating bolt being fixedly connected with the case, whereby the body section is located in the case.

4. The rotational speed adjustment mechanism of the pneumatic tool as claimed in claim 1, wherein the speed adjustment valve has three slow speed through holes having different diameters.

5. The rotational speed adjustment mechanism of the pneumatic tool as claimed in claim 4, wherein the full speed through hole and the slow speed through holes are formed on the circumference of the collar at equal intervals.

6. The rotational speed adjustment mechanism of the pneumatic tool as claimed in claim 1, wherein the speed adjustment valve further has an annular rotary sleeve which is coaxially connected with the collar and positioned on outer side of the case for controlling and adjusting the position of the collar.

\* \* \* \* \*